US012609454B1

(12) United States Patent
Pitra

(10) Patent No.: US 12,609,454 B1
(45) Date of Patent: Apr. 21, 2026

(54) LINEAR HORN ANTENNA WITH CONICAL COLLAR

(71) Applicant: CAES Systems LLC, Arlington, VA (US)

(72) Inventor: Andrew Pitra, Horsham, PA (US)

(73) Assignee: CAES Systems LLC, Arlington, VA (US)

( * ) Notice: Subject to any disclaimer, the term of this patent is extended or adjusted under 35 U.S.C. 154(b) by 37 days.

(21) Appl. No.: 18/673,664

(22) Filed: May 24, 2024

(51) Int. Cl.
*H01Q 13/02* (2006.01)

(52) U.S. Cl.
CPC ..... *H01Q 13/0225* (2013.01); *H01Q 13/0275* (2013.01)

(58) Field of Classification Search
CPC .......................... H01Q 13/0225; H01Q 13/027
See application file for complete search history.

(56) References Cited

U.S. PATENT DOCUMENTS 2,809,371 A * 10/1957 Carter .................. H01Q 19/132 343/907
3,128,467 A * 4/1964 Lanctot .................. H01Q 13/24 343/785
3,458,862 A * 7/1969 Franks ............... H01Q 13/0275 333/242
4,468,672 A * 8/1984 Dragone ................ H01Q 19/08 333/240
4,658,258 A * 4/1987 Wilson ............... H01Q 13/0208 343/840
6,271,799 B1 * 8/2001 Rief ................... H01Q 13/0258 343/786
6,320,554 B1 * 11/2001 Yuanzhu ............ H01Q 13/0275 343/786
9,991,607 B1 * 6/2018 West .................. H01Q 13/0275
10,355,359 B1 * 7/2019 Butscher .................. H01Q 5/55
11,103,925 B2 * 8/2021 Aston ..................... H01Q 21/26
12,407,980 B2 * 9/2025 Smolen ..................... H04R 1/30
2003/0052831 A1 * 3/2003 Knop ................. H01Q 13/0258 343/781 R
2003/0151560 A1 * 8/2003 Kienzle ................... A61P 37/02 343/786
2003/0210197 A1 * 11/2003 Cencich ............. H01Q 13/0241 343/786
2005/0088355 A1 * 4/2005 Kralovec ........... H01Q 13/0208 343/781 P
2005/0104794 A1 * 5/2005 Rao .................... H01Q 13/0258 343/781 R
2005/0237253 A1 * 10/2005 Kuo ....................... H01Q 13/02 343/786
(Continued)

*Primary Examiner* — Dameon E Levi
*Assistant Examiner* — Jordan E. DeWitt
(74) *Attorney, Agent, or Firm* — Alston & Bird LLP

(57) ABSTRACT

Apparatuses, systems, and methods for a linear horn antenna with a conical collar are provided. For example, a linear horn antenna has a conical collar and a plurality of antenna feeds. The conical collar is located a first distance from a first end of the linear horn antenna. The plurality of antenna feeds include a first antenna feed and a second antenna feed. The linear horn antenna is configured to generate one or more electromagnetic fields based on one or more excitation signals received via at least one of the plurality of antenna feeds and configured to generate one or more received signals at at least one of the plurality of antenna feeds based on one or more received electromagnetic fields.

17 Claims, 12 Drawing Sheets

(56) References Cited

U.S. PATENT DOCUMENTS

| | | | | |
|---|---|---|---|---|
| 2008/0297428 | A1* | 12/2008 | Wu | H01Q 13/0266 343/786 |
| 2010/0109963 | A1* | 5/2010 | Kienzle | G01F 23/284 333/254 |
| 2010/0238086 | A1* | 9/2010 | Moon | H01Q 13/0275 343/786 |
| 2011/0304508 | A1* | 12/2011 | Remez | H01Q 13/02 342/442 |
| 2014/0292605 | A1* | 10/2014 | Roberts | H01Q 13/20 343/781 CA |
| 2014/0320364 | A1* | 10/2014 | Gu | H01Q 13/0225 343/786 |
| 2016/0138957 | A1* | 5/2016 | Blodt | H01Q 15/08 342/124 |
| 2017/0018850 | A1* | 1/2017 | Yun | H01Q 13/025 |
| 2018/0166786 | A1* | 6/2018 | Kozyrev | H01Q 13/02 |
| 2020/0116543 | A1* | 4/2020 | Fredriksson | G01S 7/282 |
| 2021/0036419 | A1* | 2/2021 | Shamblin | H01Q 1/526 |
| 2021/0203076 | A1* | 7/2021 | Boin | H01Q 1/288 |
| 2022/0094066 | A1* | 3/2022 | Lebayon | H01Q 19/18 |
| 2023/0378662 | A1* | 11/2023 | Massman | H01Q 5/25 |
| 2024/0250442 | A1* | 7/2024 | Park | H01Q 13/0275 |

* cited by examiner

LINEAR HORN ANTENNA WITH CONICAL COLLAR

TECHNOLOGICAL FIELD

Example embodiments of the present disclosure relate generally to an improved antenna, and particularly to a linear horn antenna with a conical collar.

BACKGROUND

A linear horn antenna may be used to generate electromagnetic fields, including an electric field (E) and a magnetic field (H). The electromagnetic fields of conventional linear horn antennas may generate unwanted or inefficient beam patterns, which may be due to their structure.

The inventor has identified numerous areas of improvement in the existing technologies and processes, which are the subjects of embodiments described herein. Through applied effort, ingenuity, and innovation, many of these deficiencies, challenges, and problems have been solved by developing solutions that are included in embodiments of the present disclosure, some examples of which are described in detail herein.

BRIEF SUMMARY

Various embodiments described herein relate to linear horn antennas with a conical collar.

In accordance with some embodiments of the present disclosure, an example apparatus is provided. The apparatus may comprise: a linear horn antenna with a conical collar and a plurality of antenna feeds; wherein the conical collar is located a first distance from a first end of the linear horn antenna; wherein the plurality of antenna feeds include a first antenna feed and a second antenna feed; and wherein the linear horn antenna is configured to generate one or more electromagnetic fields based on one or more excitation signals received via at least one of the plurality of antenna feeds and configured to generate one or more received signals at at least one of the plurality of antenna feeds based on one or more received electromagnetic fields.

In accordance with some embodiments of the present disclosure, an example system is provided. The system comprising: a linear horn antenna with a conical collar and a plurality of antenna feeds; wherein the conical collar is located a first distance from a first end of the linear horn antenna; wherein the plurality of antenna feeds include a first antenna feed and a second antenna feed; wherein the linear horn antenna is configured to generate one or more electromagnetic fields based on one or more excitation signals received via at least one of the plurality of antenna feeds; a memory having one or more computer readable instructions; a processor communicatively coupled with the memory, wherein the at least one processor executing the one or more computer readable instructions stored in the memory is configured to: generate the one or more excitation signals; transmit the one or more excitation signals to at least one of the plurality antenna feeds of the linear horn antenna; and generate one or more received signals at at least one of the plurality of antenna feeds based on one or more received electromagnetic fields.

In accordance with some embodiments of the present disclosure, an example method is provided. The method comprising: generating one or more excitation signals; transmitting the one or more excitation signals to at least one of a plurality of antenna feeds of a linear horn antenna with a conical collar; wherein the conical collar is located a first distance from a first end of the linear horn antenna; wherein the plurality of antenna feeds include a first antenna feed and a second antenna feed; wherein the linear horn antenna is configured to generate one or more electromagnetic fields based on one or more excitation signals received via at least one of the plurality of antenna feeds; receiving the one or more excitation signals at least one of the plurality of antenna feeds; generating one or more electromagnetic fields with the linear horn antenna; and generating one or more received signals at at least one of the plurality of antenna feeds based on one or more received electromagnetic fields.

In some embodiments, the conical collar is tapered toward a second end of the linear horn antenna.

In some embodiments, the conical collar has a first end associated with the first end of the linear horn antenna, and wherein the first end of the conical collar is offset from the first end of the linear horn antenna by a first length.

In some embodiments, the linear horn antenna includes a plurality of ridges internal to a linear horn body of the linear horn antenna.

In some embodiments, the plurality of ridges are configured with a taper that broadens as towards the first end of the linear horn antenna.

In some embodiments, the linear horn antenna includes a back plate at a second end of the linear horn antenna.

In some embodiments, the second antenna feed is located on the linear horn antenna 90 degrees from the first antenna feed.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will also be appreciated that the scope of the disclosure encompasses many potential embodiments in addition to those here summarized, some of which will be further described below.

BRIEF SUMMARY OF THE DRAWINGS

Figure 1:
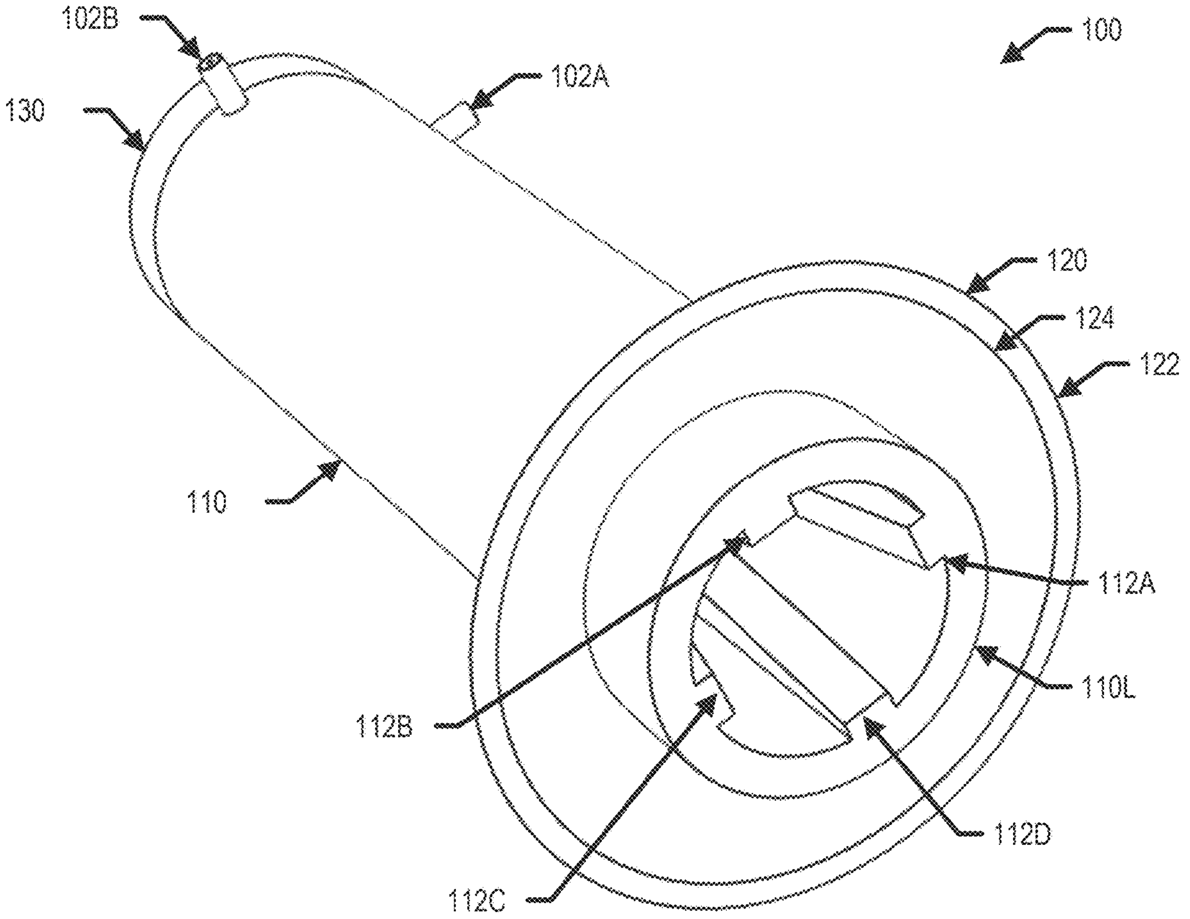
Figure 2:
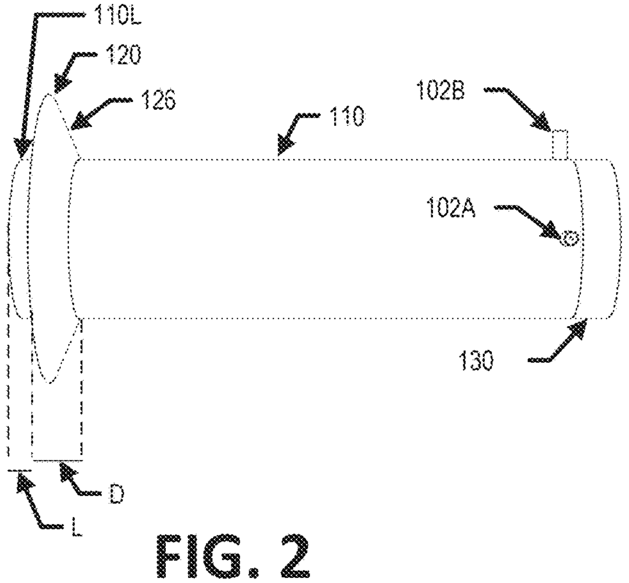
Figure 3:
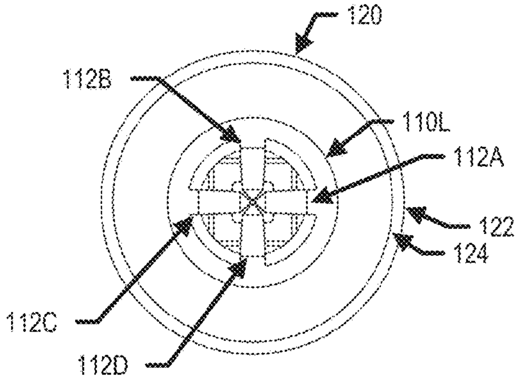
Figure 4:
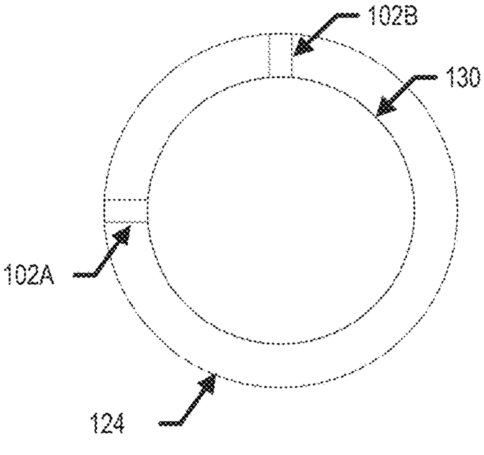
Figure 5:
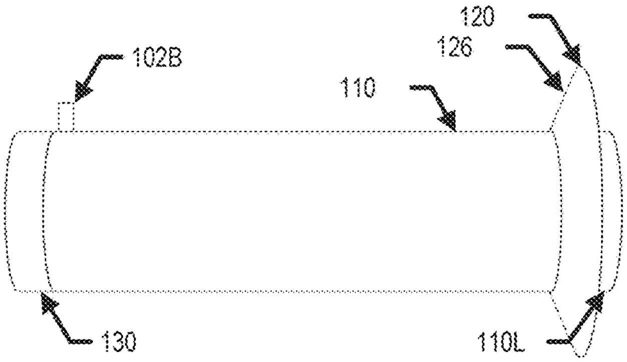
Figure 6:
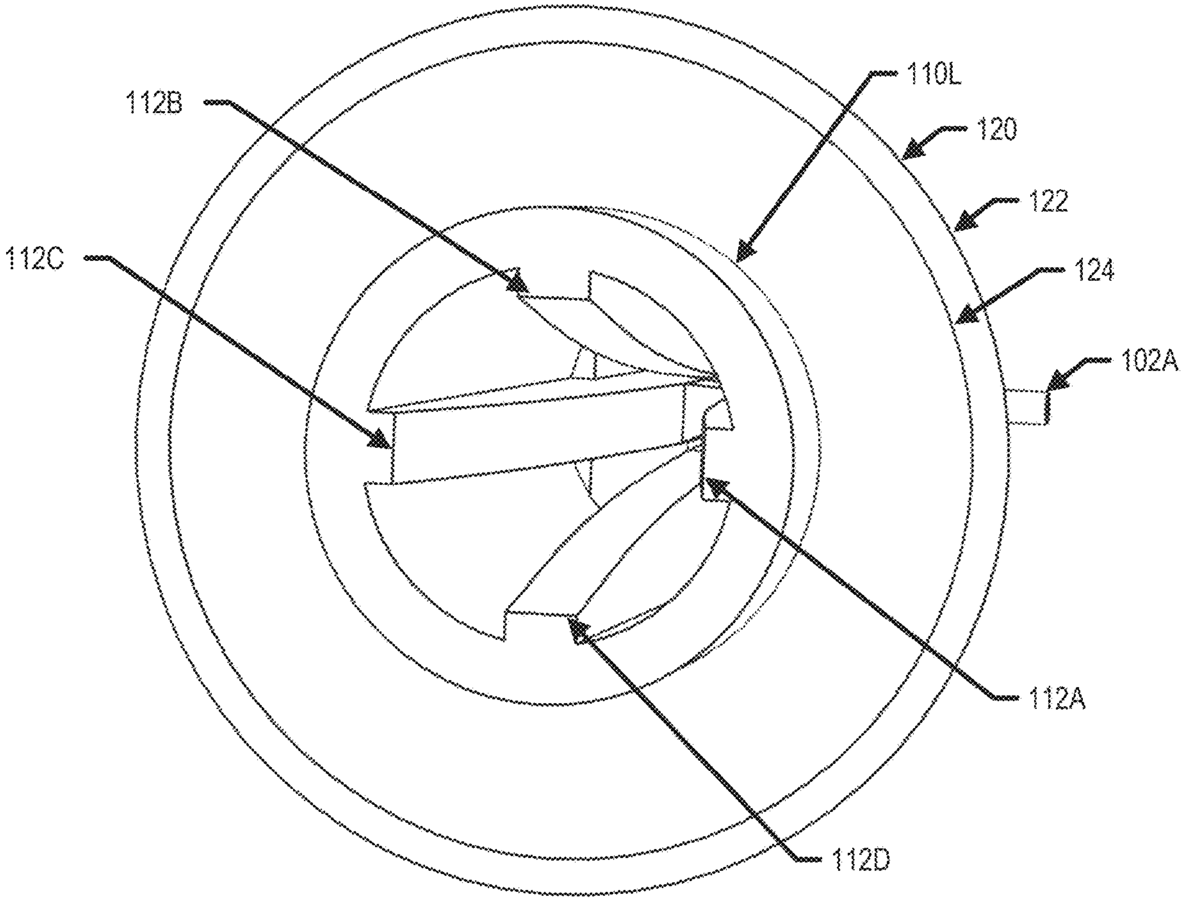
Figure 7:
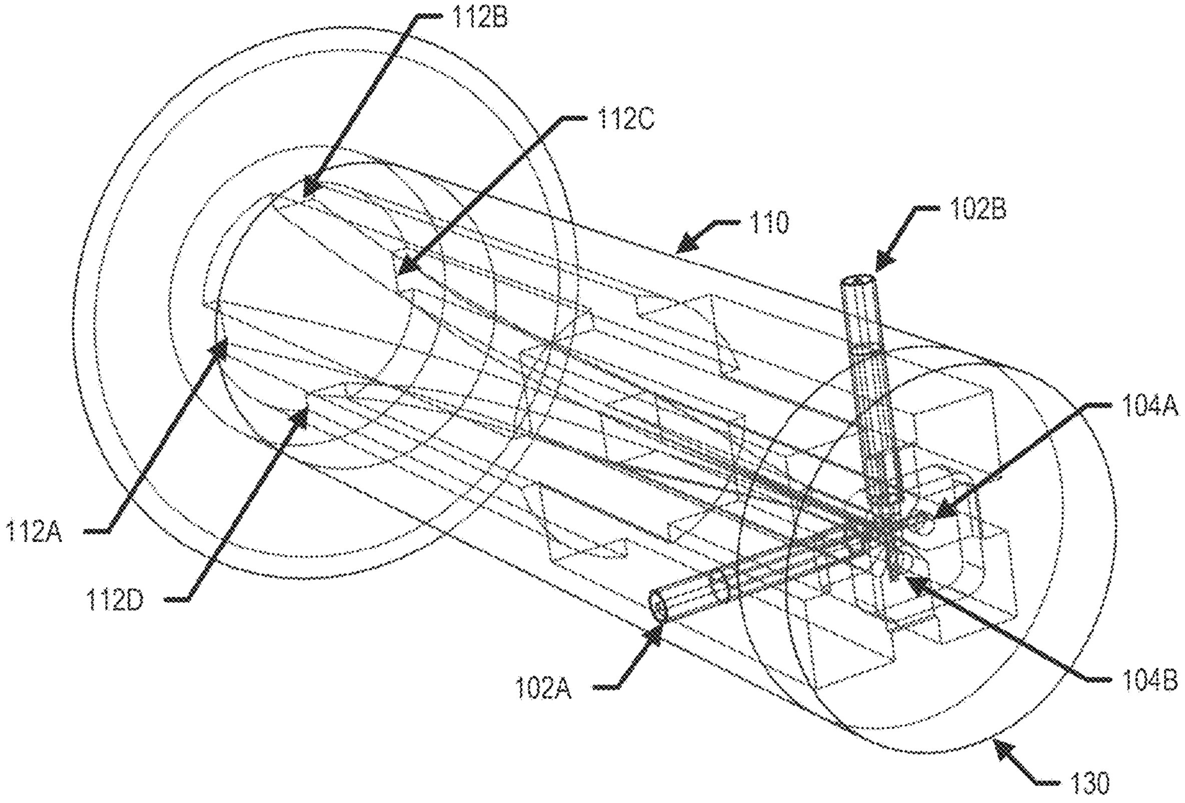
Figure 9A:
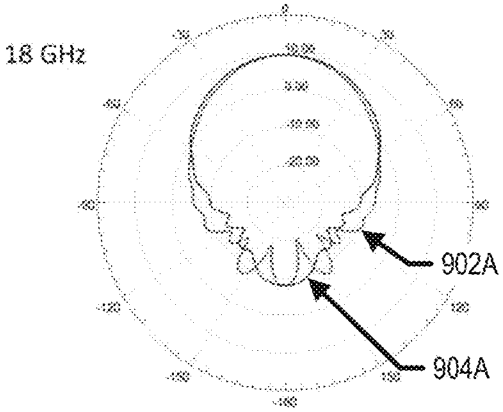
Figure 10:
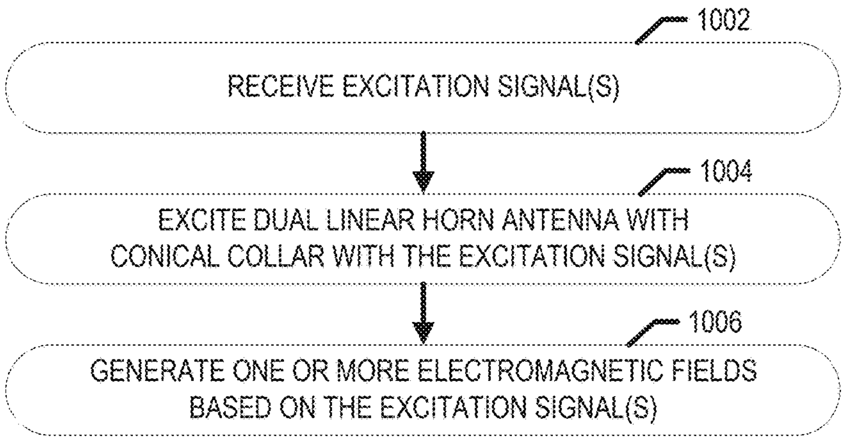
Figure 11:
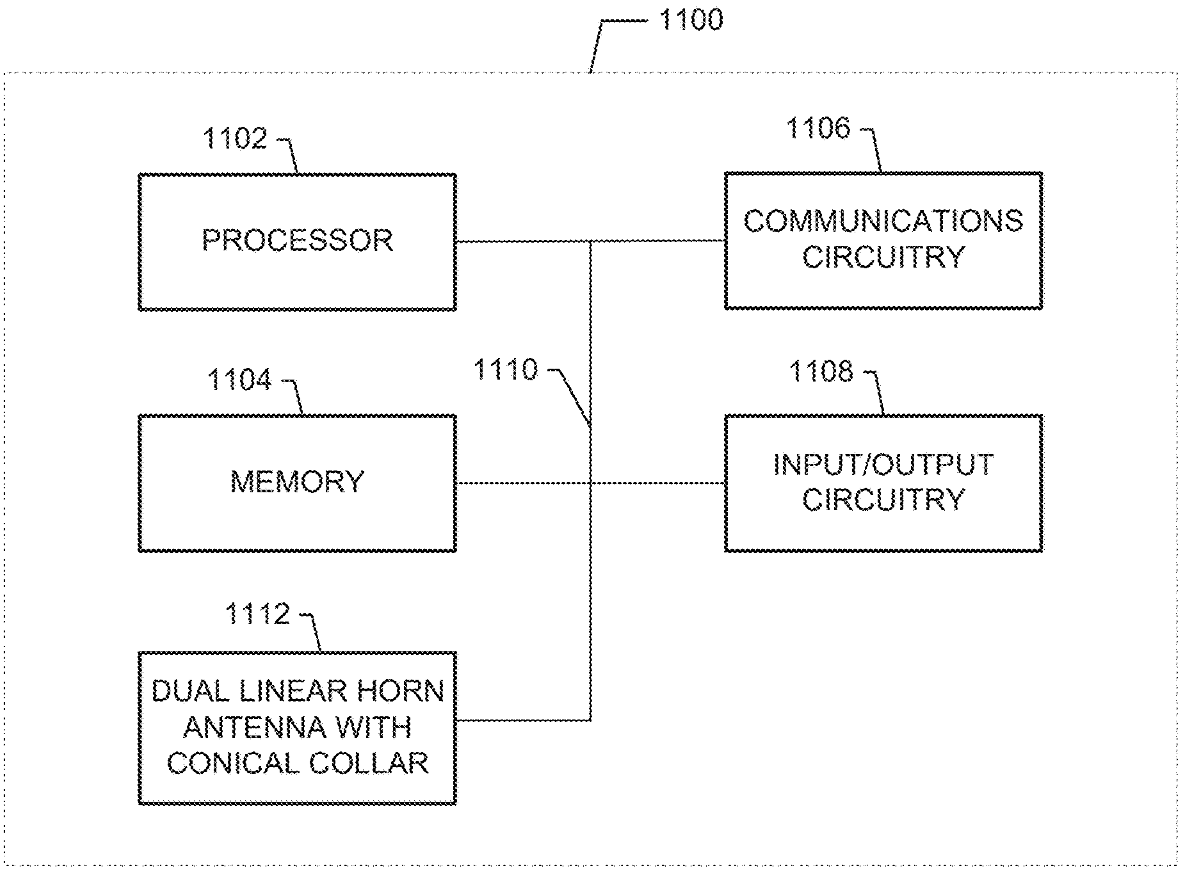

Having thus described certain example embodiments of the present disclosure in general terms, reference will now be made to the accompanying drawings, which are not necessarily drawn to scale, and wherein:

FIG. 1 illustrates a first perspective view of a dual linear horn antenna with conical collar in accordance with one or more embodiments of the present disclosure;

FIG. 2 illustrates a side view of a first side of a dual linear horn antenna with conical collar in accordance with one or more embodiments of the present disclosure;

FIG. 3 illustrates a front view of a dual linear horn antenna with conical collar in accordance with one or more embodiments of the present disclosure;

FIG. 4 illustrates a rear view of a dual linear horn antenna with conical collar in accordance with one or more embodiments of the present disclosure;

FIG. 5 illustrates a side view of a second side of a dual linear horn antenna with conical collar in accordance with one or more embodiments of the present disclosure;

FIG. 6 illustrates a second perspective view of a dual linear horn antenna with conical collar in accordance with one or more embodiments of the present disclosure;

FIG. 7 illustrates a third perspective view of a wireframe of a dual linear horn antenna with conical collar in accordance with one or more embodiments of the present disclosure;

FIGS. 8A-8E illustrate E-H planes and Az-El planes generated by a dual linear horn antenna based on excitation signals in accordance with one or more embodiments of the present disclosure;

FIGS. 9A-90 illustrate exemplary graphs associated with different excitation signals by a dual linear horn antenna based on excitation signals in accordance with one or more embodiments of the present disclosure;

FIG. 10 illustrates an exemplary flowchart of operations for a dual linear horn antenna with conical collar in accordance with one or more embodiments of the present disclosure; and FIG. 11 illustrates a device utilizing a dual linear horn antenna with conical collar in accordance with one or more embodiments of the present disclosure.

DETAILED DESCRIPTION

Some embodiments of the present disclosure will now be described more fully herein with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in various embodiments," "in one embodiment," "according to one embodiment," "in some embodiments," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments or it may be excluded.

The use of the term "circuitry" as used herein with respect to components of a system or an apparatus should be understood to include particular hardware configured to perform the functions associated with the particular circuitry as described herein. The term "circuitry" should be understood broadly to include hardware and, in some embodiments, software for configuring the hardware. For example, in some embodiments, "circuitry" may include processing circuitry, communications circuitry, input/output circuitry, and the like. In some embodiments, other elements may provide or supplement the functionality of particular circuitry.

Overview

Various embodiments of the present disclosure are directed to an improved linear horn antenna. In particular, various embodiments of the present disclosure are directed to apparatuses, system, and method for a linear horn antenna with conical collar.

Various embodiments of a linear horn antenna with conical collar in accordance with the present disclosure include a metallic conical collar located near a first end of a linear horn antenna having an aperture. This linear horn antenna with conical collar is configured to generate an electromagnetic field that radiates out of the front of the antenna, which may be referred to as the boresight, while minimizing radiation (e.g., back lobes) out the back or rear of the linear antenna.

Various embodiments of the present disclosure provide for improved performance over conventional linear horn antennas. Such improvements may depend on frequencies of excitation signals. These may include an increase in low frequency gain (e.g., approximately 2 dB in various embodiments) and reduced high frequency gain (e.g., approximately 1.5 dB in various embodiments) resulting in a flatter response. Additionally, various embodiments may also improve the beamwidth, front-back ratio, and power handling. The tuning of this antenna may be based on, among other things, the frequency of the excitation signal, the length from the front of the linear horn antenna to the start of the conical collar, and the size of the conical collar, including the taper and flare.

Exemplary Apparatuses, Systems, and Methods

FIG. 1 illustrates a first perspective view of a dual linear horn antenna with conical collar in accordance with one or more embodiments of the present disclosure. The dual linear horn with conical collar 100 is an antenna with a linear horn body 110, a conical collar 120, and a backplate 130. The dual linear horn with conical collar 100 may also include a multiple antenna feeds, such as dual feeds 102. As described herein, a feed is an antenna feed. There is a first feed 102A and a second feed 102B. The first feed 102A and the second feed 102B may each be a coaxial feed that may be configured to receive an excitation signal. It will be appreciated that while coaxial feeds are illustrated, various embodiments may include alternative feed for receiving an excitation signal. In operation, the first feed 102A may receive a first excitation signal and the second feed 102B may receive a second excitation signal. In addition to transmitting, antenna reciprocity allows for the dual linear horn antenna with conical collar in accordance with one or more embodiments of the present disclosure to be used as both a transmit antenna as well as a receive antenna. When receiving, the feeds may provide one or more signals based on the electromagnetic fields received by the dual linear horn antenna with conical collar.

The linear horn body 110 may be a cylindrical shape that has a first end and a second end. The conical collar 120 is near the first end. The first end is open or has an opening or aperture. The second end terminates with a backplate 130. The linear horn body 110 may have an outer surface area that is cylindrically shaped. The linear horn body 110 may have a hollow interior that includes a plurality of ridges 112. Various embodiments of a dual linear horn with conical collar 100 have 4 ridges 112—a first ridge 112A, a second ridge 112B, a third ridge 112C, and a fourth ridge 112D. Each of these four ridges 112 are, respectively, located 90 degrees from the adjacent two ridges on the interior of the cylindrical shape of the linear horn body. In various embodiments, the first feed 102A is associated with the first ridge 112A and the third ridge 112C and the second feeds 102B is associated with the second ridge 112B and the fourth ridge 112D. For example, a first excitation signal received at the first feed 102A may propagate down the first ridge 112A and the third ridge 112C. Similarly, a second excitation signal received at the second feed 102B may propagate down the second ridge 102B and the fourth ridge 112D. An excitation signal propagating down the respective ridges generates electromagnetic fields, such as described further herein. In various embodiments, portions of the linear horn body 110 may be similar or a variation of slot antenna and/or a Vivaldi notch antenna.

The conical collar 120 is located near the first end of the linear horn body 110. The conical collar 120 may have a first side facing in the same direction of the bore of the linear horn body 110, which is illustrated in FIG. 1. The conical collar 120 may also have a second side facing the second side of the linear horn body 110 and the backplate 130. The first side of the conical collar 120 may have a conical collar ridge 122 and a tapered interior 124. The conical collar ridge 122 may be a non-tapered portion of the conical collar and the tapered interior 124 may connect the conical collar ridge 122 to the linear horn body 110 at a tapered angle. In various embodiments, this taper may be, for example, 1 degree per 0.1 inch of height or distance away from the linear horn body 110 as the tapered interior 124 travels from the linear horn body 110 to meet the conical collar ridge 126. In various embodiments, the conical collar 120 may be metallic.

The shape and location of the conical collar 120 with respect to the linear horn body 110 provides for multiple improvements, including a more constant or flatter gain over multiple frequencies. Additionally and/or alternatively, it may provide for improved beamwidth response over multiple frequencies. Additionally and/or alternatively, it may provide for an improved front-to-back ratio, particularly at lower frequencies.

The backplate 130 may be a back short portion. In various embodiments, the backplate 130 may be configured to suppress some of the radiation pattern generated by the dual linear horn with conical collar 100, such as one or more back lobes of an electromagnetic field generated by the dual linear horn with conical collar 100. In various embodiments the backplate 130 may also provide additional gain for the electromagnetic field out of the front of the linear horn body 110. For example, the dual linear horn with conical collar 100 may generally direct or reflect some of the back lobe of a generated electromagnetic field forward through the bore sight or front of the linear horn body 110. In various embodiments, the backplate 130 may be metallic.

In various embodiments, the linear horn body 110 may be printed, such as with additive manufacturing (e.g., 3D printing), with a first material and the backplate 130 may be machined with a second material (e.g., a metal) before the linear horn body 110 and the backplate 130 are joined.

FIG. 2 illustrates a side view of a first side of a dual linear horn antenna with conical collar in accordance with one or more embodiments of the present disclosure. The side view of the first side of the dual linear horn with conical collar 100 illustrated in FIG. 2 includes the first feed 102A on the side of the dual linear horn with conical collar 100 and the second feed 102B on the top of the dual linear horn with conical collar 100. This side view of the first side illustrates how the conical collar 120 is located or offset at a length L from the first end of the linear horn body 110. The linear horn body 110 includes a front portion 110L having the length L that extends in front of the conical collar 120. The conical collar 120 covers a distance D of the linear horn body 110. FIG. 2 also illustrates the rear side 126 of the conical collar 120. The rear side 126 of the conical collar 120 has a conical shape that tapers as it goes to the rear of the linear horn body.

In various embodiments, the size and shape of the conical horn may change, which may vary performance of the dual linear horn with conical collar 100. For example, the diameter, setback length (L) of the conical collar 120 from the front of the linear horn body 110, and taper of the conical collar 120 may change the electromagnetic field generated by the dual linear horn with conical collar 100.

FIG. 3 illustrates a front view of a dual linear horn antenna with conical collar in accordance with one or more embodiments of the present disclosure. The front view of the dual linear horn antenna 100 illustrates the circular shape of the linear horn body 110, particularly the front portion 110L, and of the conical collar 120 when viewed from the front of the dual linear horn with conical collar 100. Additionally, this figures illustrates how each of the ridges 112 (i.e., 112A, 112B, 112C, and 112D) are arranged 90 degrees from each other on the interior of the linear horn body 100.

FIG. 4 illustrates a rear view of a dual linear horn antenna with conical collar in accordance with one or more embodiments of the present disclosure. The rear view of the dual linear horn antenna 100 illustrates the circular shape of the linear horn body 100 and of the conical collar 120 when viewed from the rear of the dual linear horn with conical collar 100. This view also illustrates how the first feed 102A and the second feed 102B are separated by 90 degrees on the exterior of the linear horn body 110, which corresponds to the location of certain of the ridges 112 on the interior of the linear horn body 110.

FIG. 5 illustrates a side view of a second side of a dual linear horn antenna with conical collar in accordance with one or more embodiments of the present disclosure. The side view of the second side of the dual linear horn with conical collar 100 illustrated in FIG. 5 includes the second feed 102B on the top of the dual linear horn with conical collar 100. This side view of the second side also illustrates how the conical collar 120 is located or offset at a length L from the first end of the linear horn body 110. Similarly, it illustrates the linear horn body 110 with a front portion 110L having the length L that extends in front of the conical collar 120. The conical collar 120 also includes the rear side 126.

FIG. 6 illustrates a second perspective view of a dual linear horn antenna with conical collar in accordance with one or more embodiments of the present disclosure. In this perspective view the front of the dual linear horn with conical collar 100 is more visible than, for example, the perspective view of FIG. 1. FIG. 6 illustrates more of the ridges 112 and how each of the ridges 112 may decrease in size as the ridges 112 reaches the opening or aperture of the linear horn body 110. FIG. 6 also illustrates the first feed 102A, front portion 110L, conical collar 120, conical collar ridge 122, and tapered interior 124.

FIG. 7 illustrates a third perspective view of a wireframe of a dual linear horn antenna with conical collar in accordance with one or more embodiments of the present disclosure. The wireframe of the dual linear horn with conical collar 100 illustrates how the first feed 102A is connected at a termination 104A to a ridge, particularly third ridge 112C and how second feed 102B is connected at a termination 104B to a ridge, particularly to the fourth ridge 112D. The first feed 102A is associated with the first ridge 112A and 112C that are used to generate a field based on an excitation signal received via the first feed 102A. Similarly, the second feed 102B is associated with the second ridge 112B and 112D that are used to generate a field based on an excitation signal received via second feed 102B.

The "dual" in the dual linear horn with conical collar 100 refers to the two inputs of first feed 102A and 102B. In various embodiments, these inputs may also be referred to, respectively, as J1 and J2. Each of first feed 102A and second feed 102B may be a coaxial connection fed into the interior of the linear horn body 110.

In various embodiments, there may be only one input 102A. In various embodiments with only one input of first feed 102A, then would only have one coax feeding a single set of ridges of a ridges 112A and 112C. With the dual linear horn with conical collar 100 there are two feeds and thus two sets of ridges-a first set of the first ridge 112A and third ridge 112C and a second set of the second ridge 112B and fourth ridge 112D. Exciting the respective sets of ridges generates the radiation that is an electromagnetic field. The 90 degree offsets between the sets of ridges allow for different polarizations to be used based on how different input signals fed to the dual linear horn with conical collar 100. As illustrated in FIG. 7, while these feeds from the first feed 102A and second feed 102B appear to cross each other, these feeds are isolated and do not touch.

Figure 8A:
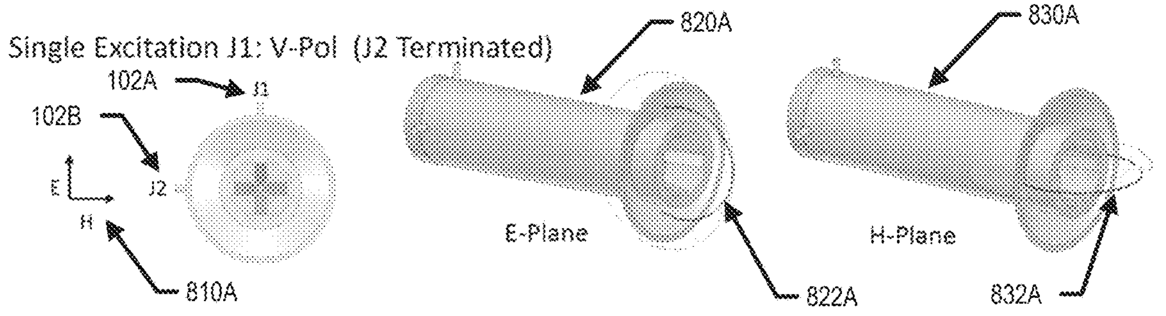
Figure 8B:
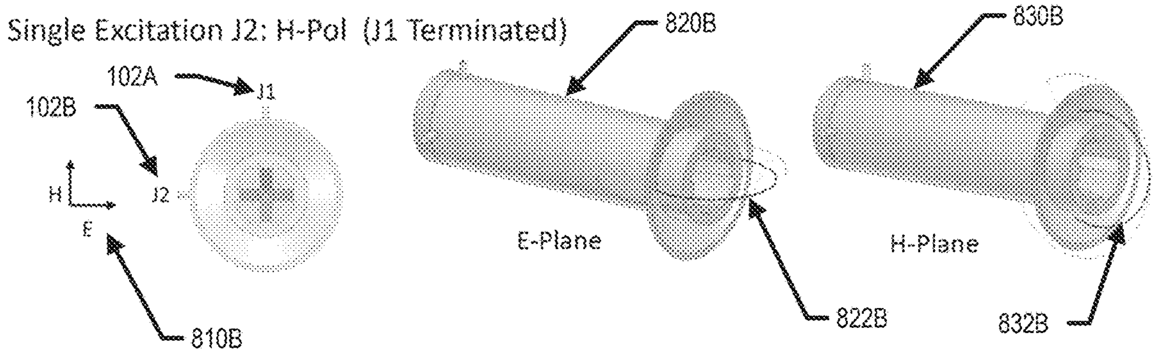
Figure 8C:
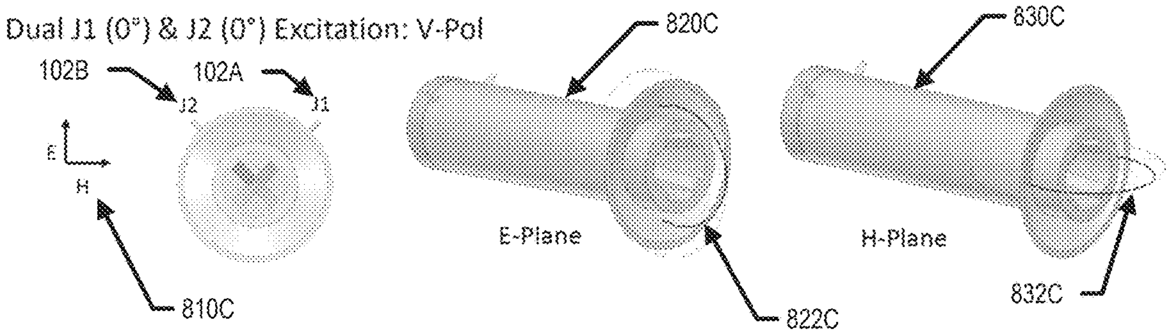
Figure 8D:
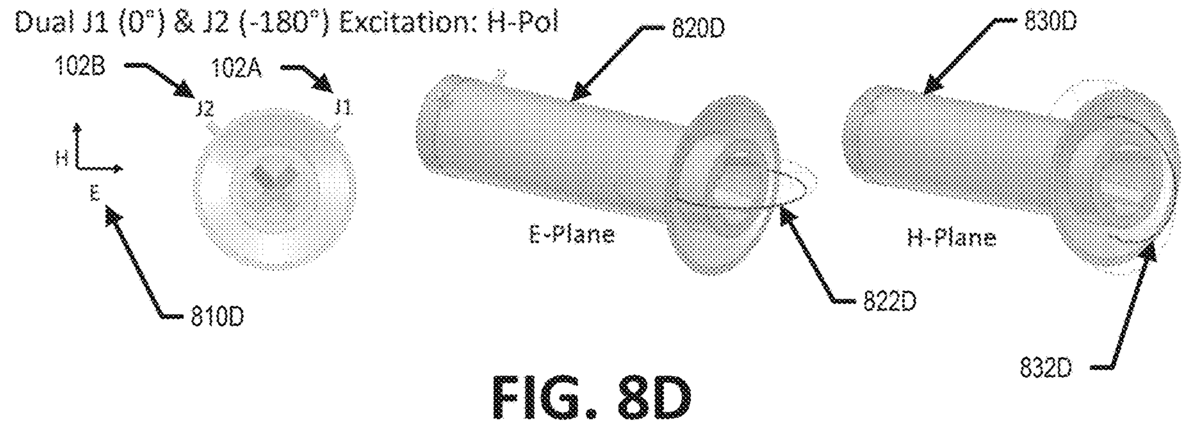
Figure 8E:
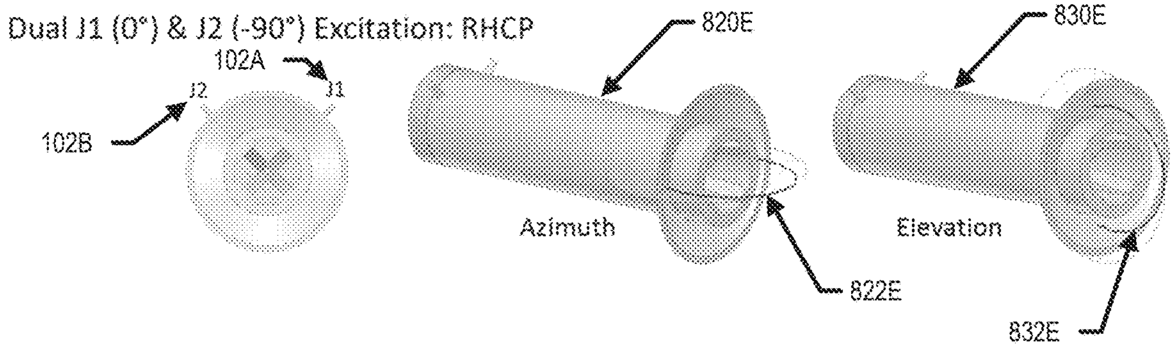

FIGS. 8A-8E illustrate E-H planes and Az-El planes generated by a dual linear horn antenna based on excitation signals in accordance with one or more embodiments of the present disclosure. FIGS. 8A-8D illustrate E-H planes that are associated with linearly polarized antenna configurations. FIG. 8E illustrates Az-El (Azimuth and Elevation) planes since the wave is circularly polarized for the excitation. For circular polarization, the electric (& magnetic) field vector rotates as the wave propagates. Thus the reason to specify Azimuth (Az) and Elevation (El) radiation planes.

An electromagnetic field generated by the dual linear horn antenna with conical collar 100 based on excitation signals received via a first feed 102A (J1) and second feed 102B (J2) contains an electric field in an E-Plane and a magnetic field in a H-Plane. In various embodiments, the dual linear horn antenna with conical collar 100 may be excited with different combinations of excitation signals, and FIGS. 8A-8E illustrates different electric fields in an E-Plane and a magnetic fields in a H-Plane for some of these embodiments.

FIG. 8A illustrates E-H planes generated by a dual linear horn antenna with conical collar 100 based on a single excitation signal at first feed 102A with second feed 102B terminated, which may be referred to as a single excitation J1 generating a vertical polarization or V-Pol. The E-H axes 810A illustrate that direction of the E-Plane and H-Plane for the orientation of the dual linear horn antenna with conical collar 100 illustrated. For example, the illustration of excited dual linear horn with conical collar 820A excited with a single excitation J1 radiates an electric field E 822A in, as illustrated, a vertical direction. The illustration of excited dual linear horn with conical collar 830A excited with a single excitation J1 radiates a magnetic field H 832A in, as illustrated, a horizontal direction, which is 90 degrees from the electric field 822A.

FIG. 8B illustrates E-H planes generated by a dual linear horn antenna with conical collar 100 based on a single excitation signal at second feed 102B with first feed 102A terminated, which may be referred to as a single excitation J2 generating a horizontal polarization or H-Pol. The E-H axes 810B illustrate that direction of the H-Plane and E-Plane for the orientation of the dual linear horn antenna with conical collar 100 illustrated. For example, the illustration of excited dual linear horn with conical collar 820B excited with a single excitation J2 radiates an electric field E 822B in, as illustrated, a horizontal direction. The illustration of excited dual linear horn with conical collar 830B excited with a single excitation J2 radiates a magnetic field H 832B in, as illustrated, a vertical direction, which is 90 degrees from the electric field 822B.

As will be appreciated, FIGS. 8C-8E rotate the illustrated dual linear horn antenna with conical collar 100 from the illustration of the dual linear horn antenna with conical collar 100 in FIGS. 8A and 8B.

FIG. 8C illustrates E-H planes generated by a dual linear horn antenna with conical collar 100 based on a first excitation signal with 0 degree phase shift at first feed 102A and a second excitation signal with a 0 degrees phase shift at second feed 102B, which may be referred to as a dual J1 (0°) J2 (0°) excitation. The E-H axes 810C illustrate that direction of the E-Plane and H-Plane for the orientation of the dual linear horn antenna with conical collar 100 illustrated. For example, the illustration of excited dual linear horn with conical collar 820C excited with a dual J1 (0°) J2 (0°) excitation radiates an electric field E 822C in, as illustrated, a vertical direction. The illustration of excited dual linear horn with conical collar 830A excited with a dual J1 (0°) J2 (0°) excitation radiates a magnetic field H 832C in, as illustrated, a horizontal direction, which is 90 degrees from the electric field 822C.

FIG. 8D illustrates E-H planes generated by a dual linear horn antenna with conical collar 100 based on a first excitation signal with 0 degree phase shift at first feed 102A and a second excitation signal with a −180 degrees phase shift at second feed 102B, which may be referred to as a dual J1 (0°) J2 (−180°) excitation. The E-H axes 810D illustrate that direction of the E-Plane and H-Plane for the orientation of the dual linear horn antenna with conical collar 100 illustrated. For example, the illustration of excited dual linear horn with conical collar 820D excited with a dual J1 (0°) J2 (−180°) excitation radiates an electric field E 822D in, as illustrated, a horizontal direction. The illustration of excited dual linear horn with conical collar 830D excited with a dual J1 (0°) J2 (−180°) excitation radiates a magnetic field H 832D in, as illustrated, a vertical direction, which is 90 degrees from the electric field 822D.

FIG. 8E illustrates Az-El planes generated by a dual linear horn antenna with conical collar 100 based on a first excitation signal with 0 degree phase shift at first feed 102A and a second excitation signal with a −90 degrees phase shift at second feed 102B, which may be referred to as a dual J1 (0°) J2 (−90°) excitation. Additionally, such a configuration is for a circularly polarized wave. With a circularly polarized wave the electric (& magnetic) field vector rotates as the wave propagates. Thus the reason to specify Azimuth (Az) and Elevation (El) radiation planes. For example, the illustration of excited dual linear horn with conical collar 820E excited with a dual J1 (0°) J2 (−90°) excitation for a circularly polarized wave radiates an electromagnetic wave with azimuth or horizontal plane 822E and elevation or vertical plane 832E, as illustrated.

FIGS. 9A-90 illustrate exemplary graphs associated with different excitation signals by a dual linear horn antenna based on excitation signals in accordance with one or more embodiments of the present disclosure. The exemplary graphs beam patterns on polar plots.

Figure 9B:
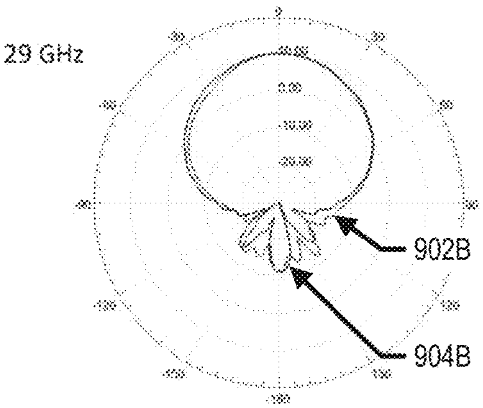
Figure 9C:
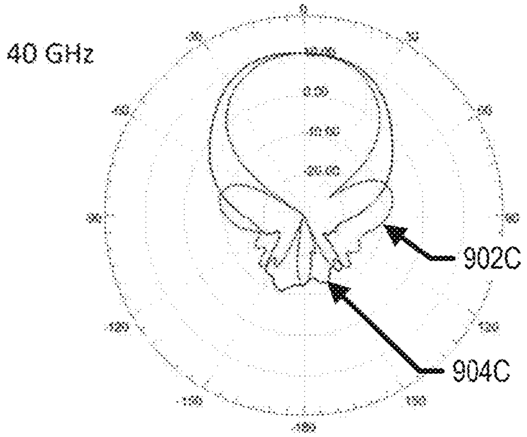

FIGS. 9A-9C illustrate exemplary graphs associated with a single excitation J1 in accordance with one or more embodiments of the present invention. FIG. 9A illustrates a beam plot of the E-Plane to illustrate the 3 dB beamwidth of the electric field 902A and of the H-Plane to illustrate the 3 dB beamwidth of the magnetic field 904A, both of which were generated based on this excitation signal at 18 GHz. FIG. 9B illustrates a beam plot of the E-Plane to illustrate the 3 dB beamwidth of the electric field 902B and of the H-Plane to illustrate the 3 dB beamwidth of the magnetic field 904B, both of which were generated based on this excitation signal at 29 GHz. FIG. 9C illustrates a beam plot of the E-Plane to illustrate the 3 dB beamwidth of the electric field 902C and of the H-Plane to illustrate the 3 dB beamwidth of the magnetic field 904C, both of which were generated based on this excitation signal at 40 GHz.

Figure 9D:
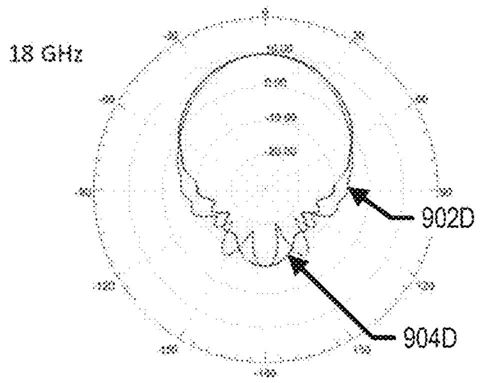
Figure 9E:
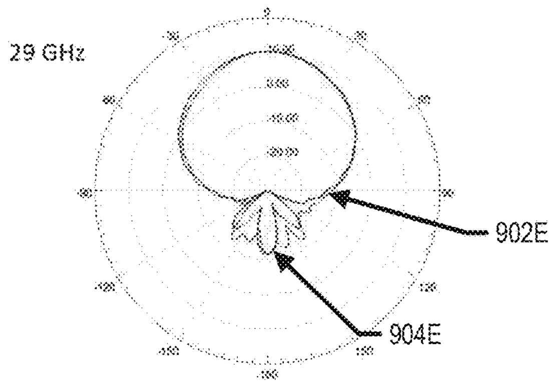
Figure 9F:
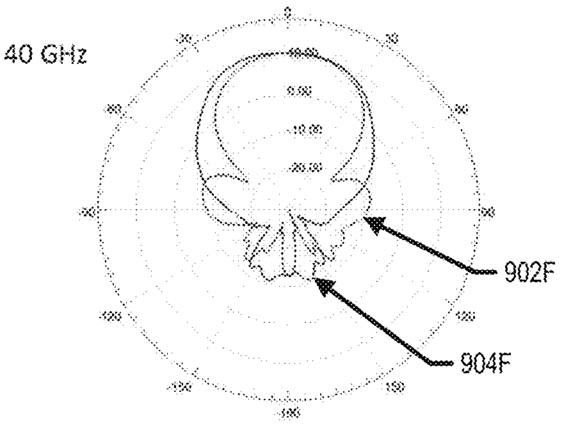

FIGS. 9D-9F illustrate exemplary graphs associated with a single excitation J2 in accordance with one or more embodiments of the present invention. FIG. 9D illustrates a beam plot of the E-Plane to illustrate the 3 dB beamwidth of the electric field 902D and of the H-Plane to illustrate the 3 dB beamwidth of the magnetic field 904D, both of which were generated based on this excitation signal at 18 GHz. FIG. 9E illustrates a beam plot of the E-Plane to illustrate the 3 dB beamwidth of the electric field 902E and of the H-Plane to illustrate the 3 dB beamwidth of the magnetic field 904E, both of which were generated based on this excitation signal at 29 GHz. FIG. 9F illustrates a beam plot of the E-Plane to illustrate the 3 dB beamwidth of the electric field 902F and of the H-Plane to illustrate the 3 dB beamwidth of the magnetic field 904F, both of which were generated based on this excitation signal at 40 GHz.

Figure 9G:
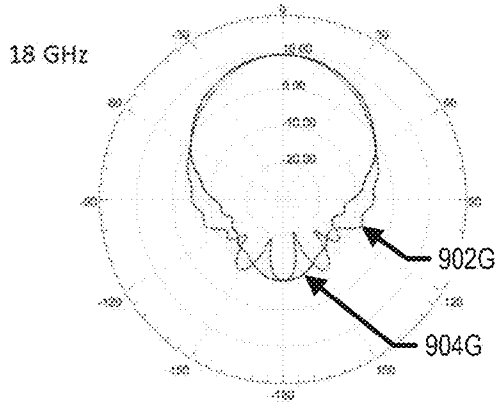
Figure 9H:
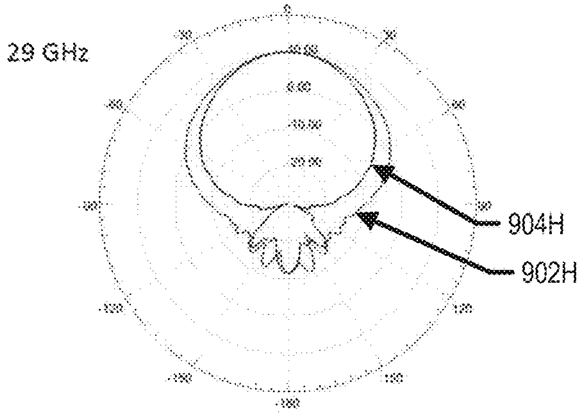
Figure 9I:
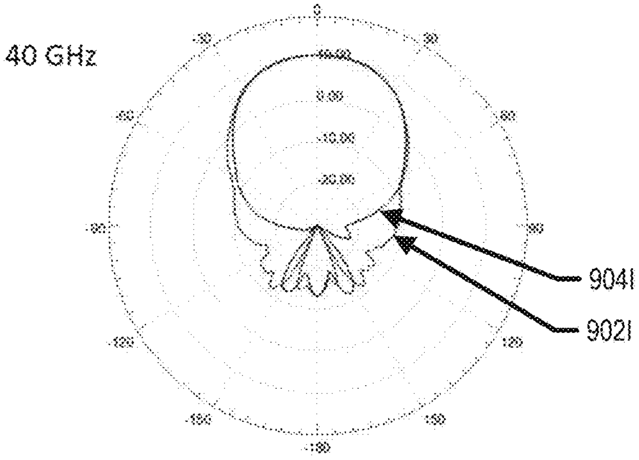

FIGS. 9G-91 illustrate exemplary graphs associated with a dual J1 (0°) J2 (0°) excitation in accordance with one or more embodiments of the present invention. FIG. 9G illustrates a beam plot of the E-Plane to illustrate the 3 dB beamwidth of the electric field 902G and of the H-Plane to illustrate the 3 dB beamwidth of the magnetic field 904G, both of which were generated based on these excitation signals at 18 GHz. FIG. 9H illustrates a beam plot of the E-Plane to illustrate the 3 dB beamwidth of the electric field 902H and of the H-Plane to illustrate the 3 dB beamwidth of the magnetic field 904H, both of which were generated based on these excitation signals at 29 GHz. FIG. 9I illustrates a beam plot of the E-Plane to illustrate the 3 dB beamwidth of the electric field 902I and of the H-Plane to illustrate the 3 dB beamwidth of the magnetic field 904I, both of which were generated based on these excitation signals at 40 GHz.

Figure 9J:
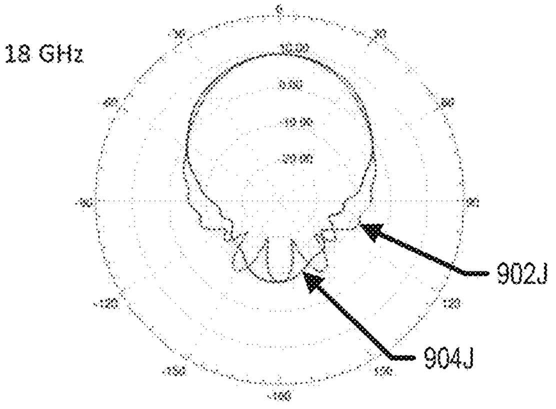
Figure 9K:
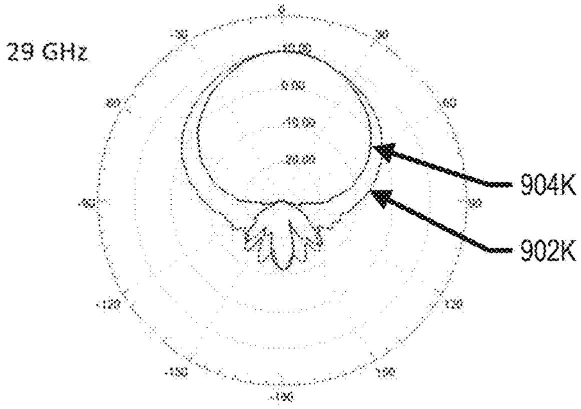
Figure 9L:
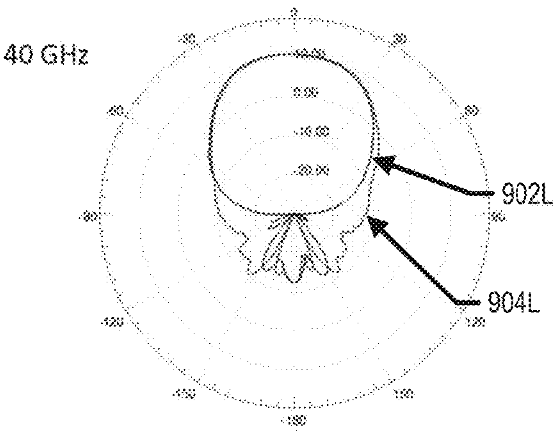

FIGS. 9J-9L illustrate exemplary graphs associated with a dual J1 (0°) J2 (−180°) excitation in accordance with one or more embodiments of the present invention. FIG. 9J illustrates a beam plot of the E-Plane to illustrate the 3 dB beamwidth of the electric field 902J and of the H-Plane to illustrate the 3 dB beamwidth of the magnetic field 904J, both of which were generated based on these excitation signals at 18 GHz. FIG. 9K illustrates a beam plot of the E-Plane to illustrate the 3 dB beamwidth of the electric field 902K and of the H-Plane to illustrate the 3 dB beamwidth of the magnetic field 904K, both of which were generated based on these excitation signals at 29 GHz. FIG. 9L illustrates a beam plot of the E-Plane to illustrate the 3 dB beamwidth of the electric field 902L and of the H-Plane to illustrate the 3 dB beamwidth of the magnetic field 904L, both of which were generated based on these excitation signals at 40 GHz.

Figure 9M:
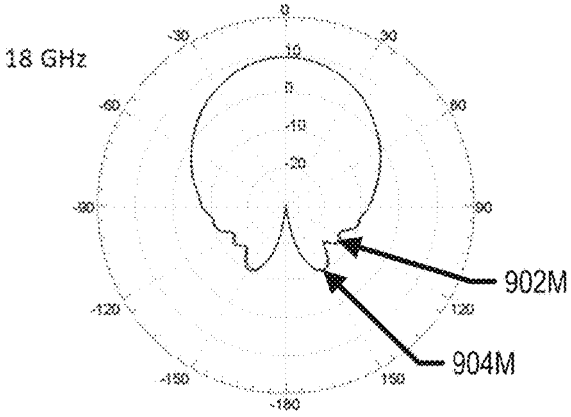
Figure 9N:
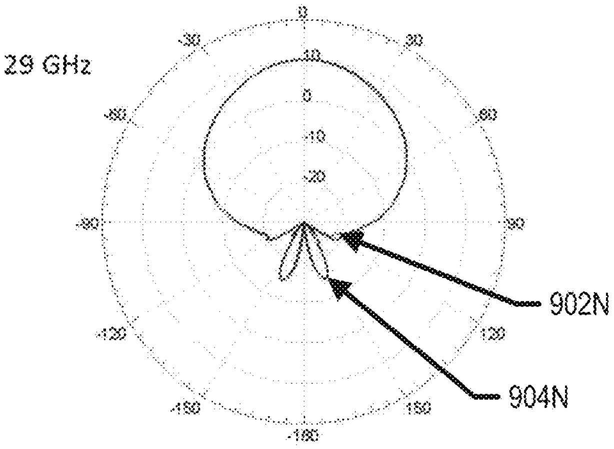
Figure 9O:
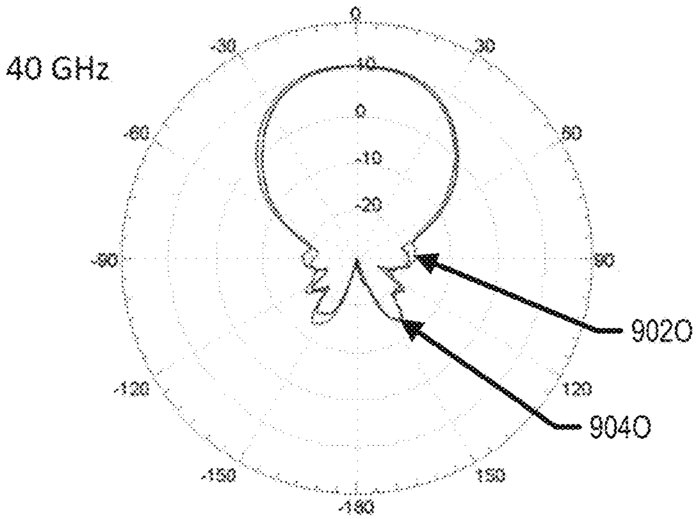

FIGS. 9M-90 illustrate exemplary graphs associated with a dual J1 (0°) J2 (−90°) excitation in accordance with one or more embodiments of the present invention. FIG. 9M illustrates a beam plot of the El-Plane to illustrate the 3 dB beamwidth of the electromagnetic field 902M and of the Az-Plane to illustrate the 3 dB beamwidth of the electromagnetic field 904M, both of which were generated based on these excitation signals at 18 GHz. FIG. 9N illustrates a beam plot of the El-Plane to illustrate the 3 dB beamwidth of the electromagnetic field 902N and of the Az-Plane to illustrate the 3 dB beamwidth of the electromagnetic field 904N, both of which were generated based on these excitation signals at 29 GHz. FIG. 9O illustrates a beam plot of the El-Plane to illustrate the 3 dB beamwidth of the electromagnetic field 902O and of the Az-Plane to illustrate the 3 dB beamwidth of the electromagnetic field 904O, both of which were generated based on these excitation signals at 40 GHz.

FIG. 10 illustrates an exemplary flowchart of operations for a dual linear horn antenna with conical collar in accordance with one or more embodiments of the present disclosure.

At operation 1002, receive excitation signal(s). the dual linear horn with conical collar 100 may receive one or more excitation signals. These may be provided, for example, from a processor that generates these signals. In various embodiments, a first excitation signal may be provided to first feed 102A while no excitation signal is provided to second feed 102B, a second excitation signal may be provided to second feed 102B while no excitation signal is provided to first feed 102A, or a first excitation signal may be provided to first feed 102A and a second excitation signal may be provided to second feed 102B.

At operation 1004, excite dual linear horn antenna with conical collar with the excitation signal(s). The dual linear horn with conical collar 100, having received the one or more excitation signal(s), may excite the dual linear horn with conical collar 100, particularly the ridges 112 that are associated with the feed 102 that received the excitation signal(s).

At operation 1006, generate one or more electromagnetic fields based on the excitation signal(s). The excited dual linear horn with conical collar 100 generates one or more electromagnetic fields based on the excitation signal(s). The one or more electromagnetic fields radiate from the dual linear horn with conical collar 100, particularly in a forward direction (e.g., in the boresight direction).

In addition to transmitting, antenna reciprocity allows for the dual linear horn antenna with conical collar in accordance with one or more embodiments of the present disclosure to be used as both a transmit antenna as well as a receive antenna. When receiving, the feeds may provide one or more signals based on the electromagnetic fields received by the dual linear horn antenna with conical collar. A method of receiving signals may generally be the reverse of transmitting signals. For example, it may include receiving one or more electromagnetic fields, excite dual linear horn antenna with conical collar with the one or more electromagnetic fields, and generating received signal(s) that may be output via the first feed 102A and/or the second feed 102B to a processor.

FIG. 11 illustrates a device utilizing a dual linear horn antenna with conical collar in accordance with one or more embodiments of the present disclosure. The device 1100 illustrated may be a system and/or apparatus that includes a processor 1102, memory 1104, communications circuitry 1106, input/output circuitry 1108, dual linear horn antenna with conical collar 1112, and all of which may be connected by a bus or buses 1110. While such connections are illustrated as bus 1110, it will be readily appreciated that there may be multiple other connections.

The processor 1102, although illustrated as a single block, may be comprised of a plurality of components and/or processor circuitry. The processor 1102 may be implemented as, for example, various components comprising one or a plurality of microprocessors with accompanying digital signal processors; one or a plurality of processors without accompanying digital signal processors; one or a plurality of coprocessors; one or a plurality of multi-core processors; processing circuits; and various other processing elements. The processor may include integrated circuits. In various embodiments, the processor 1102 may be configured to execute applications, instructions, and/or programs stored in the processor 1102, memory 1104, or otherwise accessible to the processor 1102. When executed by the processor 1102, these applications, instructions, and/or programs may enable the execution of one or a plurality of the operations and/or functions described herein. Regardless of whether it is configured by hardware, firmware/software methods, or a combination thereof, the processor 1102 may comprise entities capable of executing operations and/or functions according to the embodiments of the present disclosure when correspondingly configured.

The memory 1104 may comprise, for example, a volatile memory, a non-volatile memory, or a certain combination thereof. Although illustrated as a single block, the memory 1104 may comprise a plurality of memory components. In various embodiments, the memory 1104 may comprise, for example, a random access memory, a cache memory, a flash memory, a hard disk, a circuit configured to store information, or a combination thereof. The memory 1104 may be configured to write or store data, information, application programs, instructions, etc. so that the processor 1104 may execute various operations and/or functions according to the embodiments of the present disclosure. For example, in at least some embodiments, a memory 1104 may be configured to buffer or cache data for processing by the processor 1102. Additionally or alternatively, in at least some embodiments, the memory 1104 may be configured to store program instructions for execution by the processor 1102. The memory 1104 may store information in the form of static and/or dynamic information. When the operations and/or functions are executed, the stored information may be stored and/or used by the processor 1102.

The communication circuitry 1106 may be implemented as a circuit, hardware, computer program product, or a combination thereof, which is configured to receive and/or transmit data from/to another component or apparatus. The computer program product may comprise computer-readable program instructions stored on a computer-readable medium (e.g., memory 1104) and executed by a processor 1102. In various embodiments, the communication circuitry 1106 (as with other components discussed herein) may be at least partially implemented as part of the processor 1102 or otherwise controlled by the processor 1102. The communication circuitry 1106 may communicate with the processor 1102, for example, through a bus 1110. Such a bus 1110 may connect to the processor 1102, and it may also connect to one or more other components of the processor 1102. The communication circuitry 1106 may be comprised of, for example, transmitters, receivers, transceivers, network interface cards and/or supporting hardware and/or firmware/software, and may be used for establishing communication with another component(s), apparatus(es), and/or system(s). The communication circuitry 1106 may be configured to receive and/or transmit data that may be stored by, for example, the memory 1104 by using one or more protocols that can be used for communication between components, apparatuses, and/or systems.

The input/output circuitry 1108 may communicate with the processor 1102 to receive instructions input by an operator and/or to provide audible, visual, mechanical, or other outputs to an operator. The input/output circuitry 1108 may comprise supporting devices, such as a keyboard, a mouse, a user interface, a display, a touch screen display, lights (e.g., warning lights), indicators, speakers, and/or other input/output mechanisms. The input/output circuitry 1108 may comprise one or more interfaces to which supporting devices may be connected. In various embodiments, aspects of the input/output circuitry 1108 may be implemented on a device used by the operator to communicate with the processor 1102. The input/output circuitry 1108 may communicate with the memory 1104, the communication circuitry 1106, and/or any other component, for example, through a bus 1110.

The dual linear horn antenna with conical collar 1112 may communicate with the processor 1102 to perform one or more operations or to receive a signal as described herein. In various embodiments, dual linear horn antenna with conical collar 1112 may receive one or more excitation signals from the processor 1102, communications circuitry 1106, and/or input/output circuitry 1108, such as to start or stop operations. In various embodiments, the dual linear horn antenna with conical collar 1112 is incorporated or located in the device 1100. It will also be appreciated that the dual linear horn antenna with conical collar 1112 may be external to the device 1100 to all the dual linear horn antenna with conical collar 1112 to be mounted in particular location or orientation.

It should be readily appreciated that the embodiments of the systems and apparatuses, described herein may be configured in various additional and alternative manners in addition to those expressly described herein.

CONCLUSION

Operations and/or functions of the present disclosure have been described herein, such as in flowcharts. The flowchart blocks support combinations of means for performing the specified operations and/or functions and combinations of operations and/or functions for performing the specified operations and/or functions. It will be understood that one or more blocks of the flowcharts, and combinations of blocks in the flowcharts, can be implemented by special purpose hardware-based computer systems which perform the specified operations and/or functions, or combinations of special purpose hardware with computer instructions.

While this specification contains many specific embodiments and implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

While operations and/or functions are illustrated in the drawings in a particular order, this should not be understood as requiring that such operations and/or functions be performed in the particular order shown or in sequential order, or that all illustrated operations be performed, to achieve desirable results. In certain circumstances, operations and/or functions in alternative ordering may be advantageous. In some cases, the actions recited in the claims may be performed in a different order and still achieve desirable results. Thus, while particular embodiments of the subject matter have been described, other embodiments are within the scope of the following claims.

While this detailed description has set forth some embodiments of the present invention, the appended claims cover other embodiments of the present invention which differ from the described embodiments according to various modifications and improvements.

Within the appended claims, unless the specific term "means for" or "step for" is used within a given claim, it is not intended that the claim be interpreted under 35 U.S.C. § 112, paragraph 6.

The invention claimed is:

1. An apparatus comprising:

a linear horn antenna with a linear horn body, a conical collar, and a plurality of antenna feeds;

a plurality of ridges internal to a linear horn body of the linear horn antenna configured to generate electromagnetic fields including at least a first ridge, a second ridge, a third ridge, and a fourth ridge;

wherein the conical collar is located on an exterior of the linear horn body at a first distance from a first end of the linear horn antenna, wherein the plurality of antenna feeds are located at a second end of the linear horn body that is opposite the first end;

wherein the plurality of antenna feeds includes a first antenna feed and a second antenna feed, wherein the first antenna feed is isolated from the second antenna feed, wherein the first antenna feed is electrically connected to the first ridge and the third ridge, and where the second antenna feed is electrically connected to the second ridge and the fourth ridge; and wherein the linear horn antenna is configured to generate one or more electromagnetic fields based on one or more excitation signals received via at least one of the plurality of antenna feeds and configured to generate one or more received signals at at least one of the plurality of antenna feeds based on one or more received electromagnetic fields.

2. The apparatus of claim 1, wherein the conical collar is tapered toward the second end of the linear horn antenna.

3. The apparatus of claim 1, wherein the conical collar has a first end associated with the first end of the linear horn antenna, and wherein the first end of the conical collar is offset from the first end of the linear horn antenna by a first length.

4. The apparatus of claim 1, wherein the plurality of ridges are configured with a taper that broadens towards the first end of the linear horn antenna.

5. The apparatus of claim 1, wherein the linear horn antenna includes a back plate at the second end of the linear horn antenna.

6. The apparatus of claim 1, wherein the linear horn body has a cylindrical shape and the second antenna feed is located on the exterior of the cylindrical shape of the linear horn body of the linear horn antenna 90 degrees from a location of the first antenna feed on the exterior of the cylindrical shape of the linear horn body.

7. A system comprising:

a linear horn antenna with a linear horn body, a conical collar, and a plurality of antenna feeds;

a plurality of ridges internal to a linear horn body of the linear horn antenna configured to generate electromagnetic fields including at least a first ridge, a second ridge, a third ridge, and a fourth ridge;

wherein the conical collar is located on an exterior of the linear horn body at a first distance from a first end of the linear horn antenna, wherein the plurality of antenna feeds are located at a second end of the linear horn body that is opposite the first end;

wherein the plurality of antenna feeds includes a first antenna feed and a second antenna feed, wherein the first antenna feed is isolated from the second antenna feed, wherein the first antenna feed is electrically connected to the first ridge and the third ridge, and where the second antenna feed is electrically connected to the second ridge and the fourth ridge;

wherein the linear horn antenna is configured to generate one or more electromagnetic fields based on one or more excitation signals received via at least one of the plurality of antenna feeds;

a memory having one or more computer readable instructions;

at least one processor communicatively coupled with the memory and executing the one or more computer readable instructions stored in the memory is configured to:

generate the one or more excitation signals;

transmit the one or more excitation signals to at least one of the plurality of antenna feeds of the linear horn antenna; and generate one or more received signals at at least one of the plurality of antenna feeds based on one or more received electromagnetic fields.

8. The system of claim 7, wherein the conical collar is tapered toward the second end of the linear horn antenna.

9. The system of claim 7, wherein the conical collar has a first end associated with the first end of the linear horn antenna, and wherein the first end of the conical collar is offset from the first end of the linear horn antenna by a first length.

10. The system of claim 7, wherein the plurality of ridges are configured with a taper that broadens towards the first end of the linear horn antenna.

11. The system of claim 7, wherein the linear horn antenna includes a back plate at the second end of the linear horn antenna.

12. The system of claim 7, wherein the linear horn body has a cylindrical shape and the second antenna feed is located on the exterior of the cylindrical shape of the linear horn body of the linear horn antenna 90 degrees from a location of the first antenna feed on the exterior of the cylindrical shape of the linear horn body.

13. A method comprising:

generating one or more excitation signals;

transmitting the one or more excitation signals to at least one of a plurality of antenna feeds of a linear horn antenna with linear horn body and a conical collar;

wherein a plurality of ridges internal to the linear horn body of the linear horn antenna are configured to generate electromagnetic fields including at least a first ridge, a second ridge, a third ridge, and a fourth ridge;

wherein the conical collar is located on an exterior of the linear horn body at a first distance from a first end of the linear horn antenna, wherein the plurality of antenna feeds are located at a second end of the linear horn body that is opposite the first end;

wherein the plurality of antenna feeds includes a first antenna feed and a second antenna feed, wherein the first antenna feed is isolated from the second antenna feed, wherein the first antenna feed is electrically connected to the first ridge and the third ridge, and where the second antenna feed is electrically connected to the second ridge and the fourth ridge;

wherein the linear horn antenna is configured to generate one or more electromagnetic fields based on one or more excitation signals received via at least one of the plurality of antenna feeds;

receiving the one or more excitation signals at least one of the plurality of antenna feeds;

generating one or more electromagnetic fields with the linear horn antenna; and generating one or more received signals at at least one of the plurality of antenna feeds based on one or more received electromagnetic fields.

14. The method of claim 13, wherein the conical collar is tapered toward the second end of the linear horn antenna.

15. The method of claim 13, wherein the conical collar has a first end associated with the first end of the linear horn antenna, and wherein the first end of the conical collar is offset from the first end of the linear horn antenna by a first length.

16. The method of claim 13, wherein the plurality of ridges are configured with a taper that broadens towards the first end of the linear horn antenna.

17. The method of claim 13, wherein the linear horn antenna includes a back plate at the second end of the linear horn antenna.

* * * * *